United States Patent
Newman et al.

(10) Patent No.: US 6,530,124 B2
(45) Date of Patent: Mar. 11, 2003

(54) MATINGLY INTERFITTED TOOL HANDLE AND EXTENSION FOR PREVENTING RELATIVE ROTATION

(75) Inventors: Robert D. Newman, Greenwood, MO (US); Robert D. Newman, Jr., Greenwood, MO (US); Judson C. Cole, Greenwood, MO (US)

(73) Assignee: Specialty Products of Greenwood, Missouri, Inc., Greenwood, MO (US); (owner of a partial interest)

( * ) Notice: Subject to any disclaimer, the term of this patent is extended or adjusted under 35 U.S.C. 154(b) by 0 days.

(21) Appl. No.: 09/682,918

(22) Filed: Oct. 31, 2001

(65) Prior Publication Data

US 2002/0021013 A1 Feb. 21, 2002

Related U.S. Application Data

(62) Division of application No. 09/632,513, filed on Aug. 4, 2000.

(51) Int. Cl.[7] .............................. B25G 3/18; B25G 3/26; B25G 3/28; F16B 21/12; F16B 7/10
(52) U.S. Cl. .............................. 16/429; 16/427; 403/13; 403/324; 403/109.8; 403/361; 15/230.11
(58) Field of Search .......................... 16/429; 15/144.4, 15/230.11; 403/103, 13, 109.1–109.8

(56) References Cited

U.S. PATENT DOCUMENTS

| | | | | | |
|---|---|---|---|---|---|
| 2,902,592 | A | * | 9/1959 | Cole et al. | 15/144.4 X |
| 3,596,946 | A | * | 8/1971 | Burton et al. | 16/429 X |
| 4,076,437 | A | * | 2/1978 | Mazzolla | 403/109.5 X |
| 4,605,378 | A | * | 8/1986 | Hamilton | 16/429 X |
| 4,659,125 | A | * | 4/1987 | Chuan | 16/429 X |
| D315,286 | S | * | 3/1991 | Graves | D8/331 |
| 5,288,161 | A | * | 2/1994 | Graves et al. | 403/324 |
| 5,507,204 | A | * | 4/1996 | Diffrient | 16/429 X |
| 5,579,558 | A | * | 12/1996 | Newman, Jr. et al. | 16/429 |
| 6,231,265 | B1 | * | 5/2001 | Rytlewski et al. | 403/13 X |
| D452,777 | S | * | 1/2002 | Newman et al. | D4/138 |

FOREIGN PATENT DOCUMENTS

DE    3046286 A1  *  7/1982

* cited by examiner

Primary Examiner—Lynne H. Browne
Assistant Examiner—Ernesto Garcia
(74) Attorney, Agent, or Firm—Hovey Williams LLP

(57) ABSTRACT

An extension pole is disclosed for use with a paint roller tool. The pole and handle cooperatively provide a smooth flush connection and prevent relative rotation therebetween. In particular, an end portion of the extension pole comprises a locking mechanism that is designed to releasably interconnect the paint roller tool and the extension pole via operation of a button assembly on the extension pole. The locking mechanism includes a housing presenting a narrow outer surface defined along a circle coaxial with the pole and snugly received within the paint roller handle. A wide outer surface spaced radially outward from the narrow surface presents a key section, which when received within a recess extending inwardly from the rear end of the tool handle, cooperates with the handle to prevent relative rotation between the tool and extension pole. Additionally, the wide surface of the extension pole, as well as the key section thereof, are designed to be flush with the gripping surface of the tool handle, thereby creating a connection that is comfortable to the user and aesthetically appealing.

7 Claims, 4 Drawing Sheets

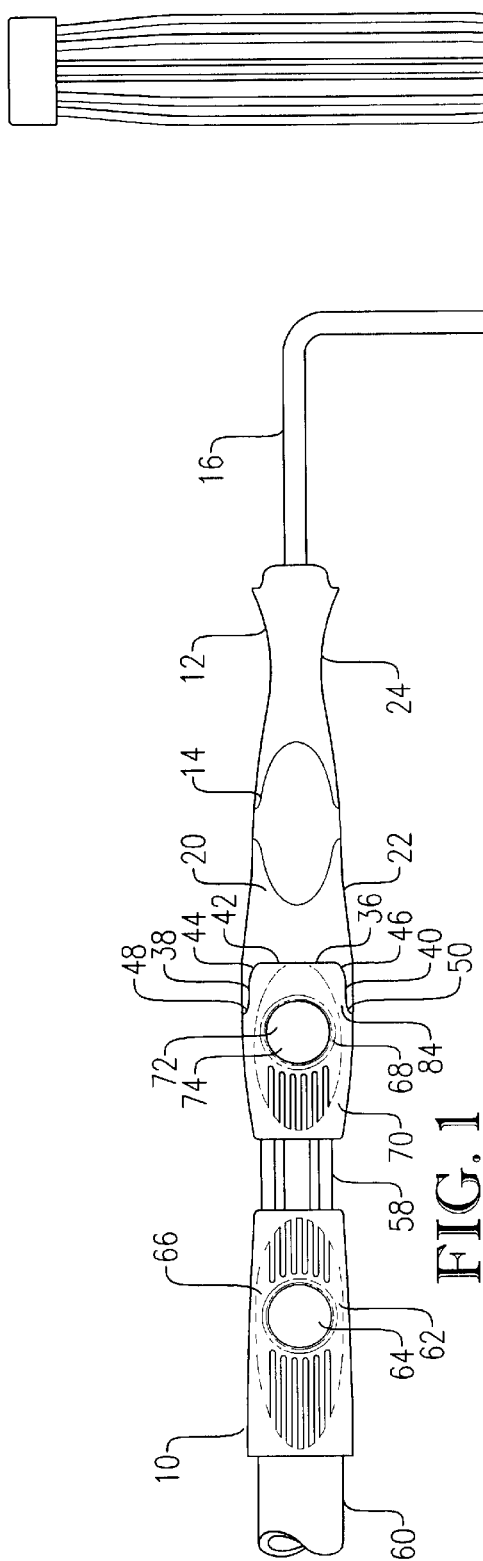
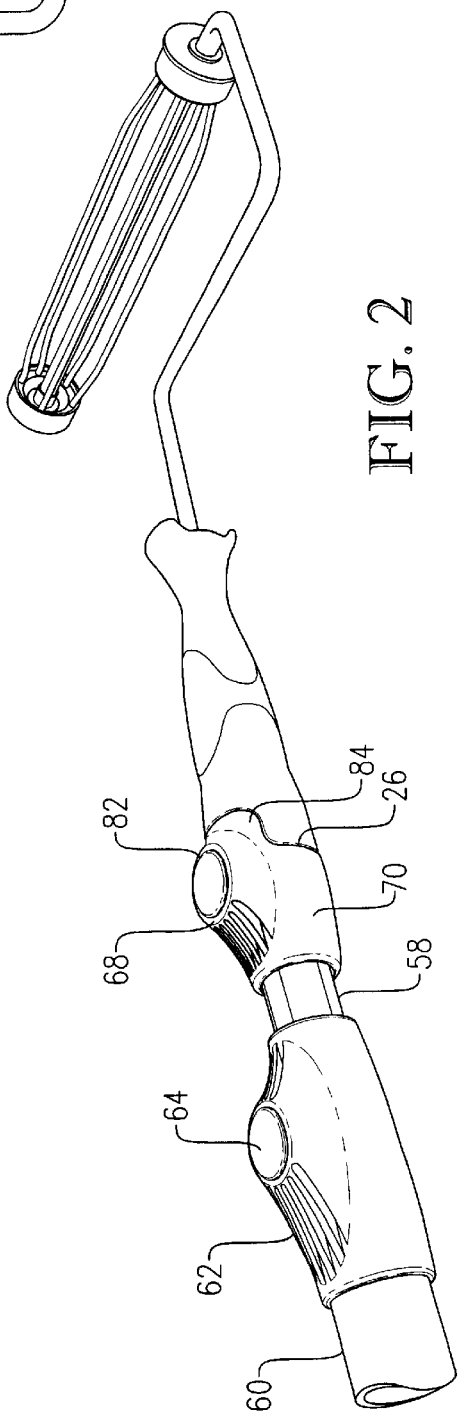

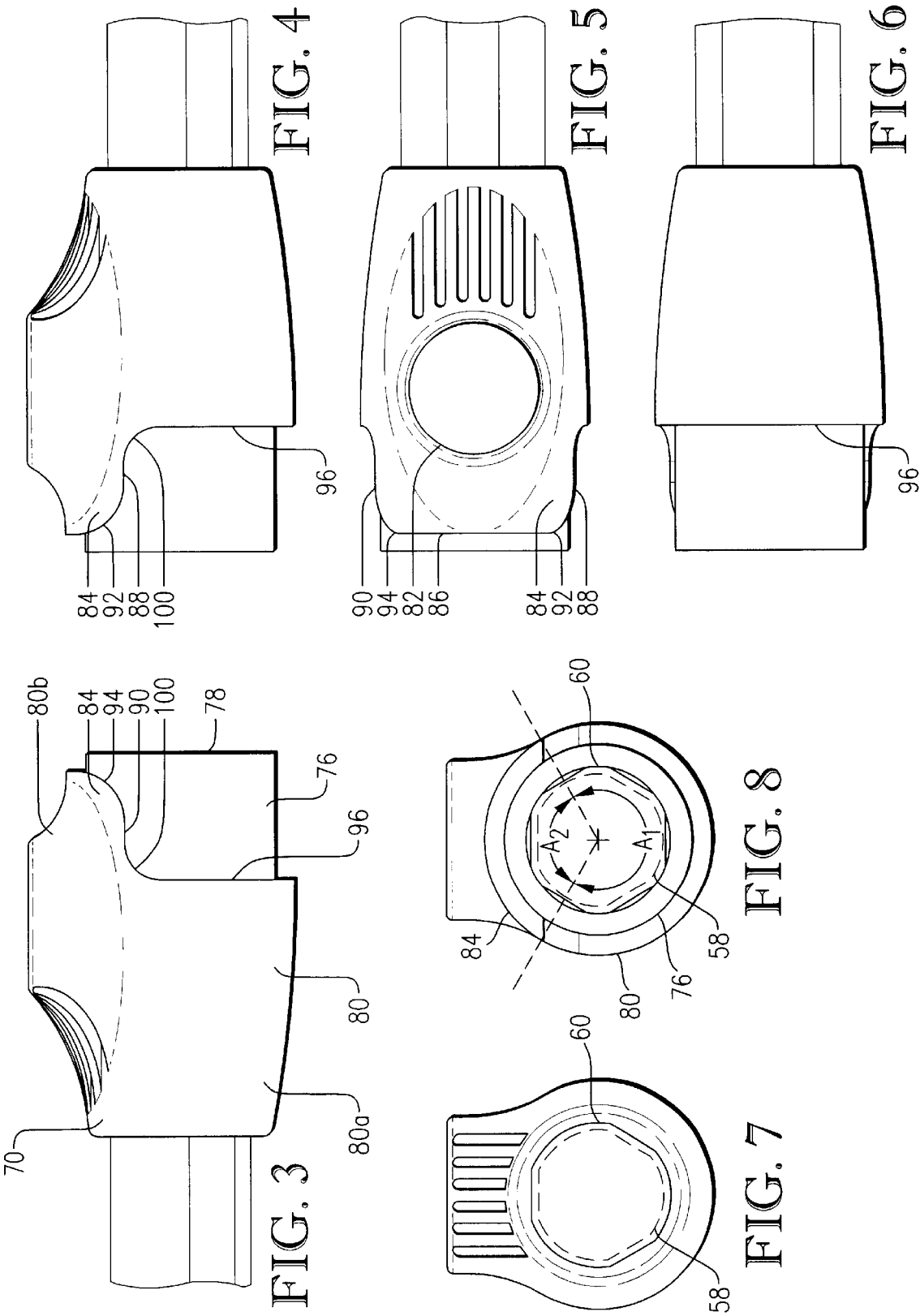

MATINGLY INTERFITTED TOOL HANDLE AND EXTENSION FOR PREVENTING RELATIVE ROTATION

CROSS REFERENCE TO RELATED APPLICATIONS

This is a divisional of application Ser. No. 09/632,513 filed Aug. 4, 2000, which is hereby incorporated by reference herein.

BACKGROUND OF INVENTION

1. Field of the Invention

The present invention relates generally to extension poles, such as a pole used with a paint roller tool to extend the reach of the tool. More particularly, the present invention relates to an extension pole that is particularly designed for removable connection to a tool handle, wherein the tool-connection end of the pole cooperates with the tool handle to prevent relative rotation and the outer pole surface adjacent the end is flush with the gripping surface handle when the pole and tool are interconnected.

2. Discussion of Prior Art

An extension pole is commonly used in various tool applications to provide access to an area that is difficult to reach (e.g., a high section of a wall that would otherwise not be reachable unless a ladder or some other elevating structure is used). Those ordinarily skilled in the art will appreciate that the means by which the tool connects to the extension pole depends on various factors, however in almost all instances the means of connection are circular and therefore the attached tool may engage in unwanted rotation during regular use.

Some extension pole applications utilize a connection geometry other than a circular configuration, thereby preventing the relative rotation. However, this type of configuration typically results in the outer surface of the tool handle and extension pole not connecting in a flush manner. The effect of this connection is unattractive and provides a less comfortable grip for the user.

In other extension pole applications, these problems are addressed with a threaded connection, in which the tool handle is simply screwed on to the extension pole. This type of connection, depending on the configuration, may alleviate the problems of unattractiveness and comfort of the user, but it fails to address the problem of relative rotation. With use, the tool invariably becomes loose on the extension pole requiring the user to interrupt his work and retighten the connection.

SUMMARY OF INVENTION

Responsive to these and other problems, an important object of the present invention is to provide an improved extension pole that extends the reach of a tool attached to the pole. It is also an important object of the present invention to provide an extension pole configured to cooperate with the tool handle in preventing relative rotation therebetween. In addition, an important object of the present invention is to provide an extension pole that cooperates with the tool handle when providing a smooth, continuous and comfortable outer surface. Yet another important object of the present invention to provide an extension pole that has an inexpensive, durable and simple construction. It is a further object of the present invention to provide an extension pole that has a smooth and comfortable grip that is attractive to the user.

In accordance with these and other objects evident from the following description of the preferred embodiment, the present invention concerns an extension pole that cooperates with the handle of a tool to provide a smooth and flush connection therebetween, while also preventing relative rotation between the pole and tool. The extension pole is uniquely configured to connect with a tool handle having an outer gripping surface, a pole-receiving socket, and a recess extending inwardly from an end of the gripping surface. An end portion of the pole includes a narrow outer surface dimensioned and configured to be received within the pole-receiving socket. The narrow surface is defined along a circle coaxial with the body such that the narrow surface is not capable of preventing relative rotation between the pole and tool. However, the end portion also presents a wide outer surface that is spaced radially outward from the narrow surface and is dimensioned and configured to be flush with the gripping surface of the handle. The wide surface provides a key section that projects toward the one end beyond at least part of the narrow surface so as to be received in the recess of the handle when the pole is connected to the tool. The key section consequently cooperates with the handle to prevent relative rotation between the pole and the tool. The present invention also concerns the pole in combination with the tool.

Other aspects and advantages of the present invention will be apparent from the following detailed description of the preferred embodiment and the accompanying drawing figures.

BRIEF DESCRIPTION OF DRAWINGS

FIG. 1 is a fragmentary, plan view of an extension pole constructed in accordance with the principles of the present invention wherein the pole is shown connected to a paint roller;

FIG. 2 is a perspective view of the assembly shown in FIG. 1;

FIG. 3 is a fragmentary, enlarged side elevational view of the tool-connecting end of the extension pole, with the tool being removed so that recessed outer surface of the locking mechanism is visible;

FIG. 4 is an elevational view of the side of the extension pole opposite from that depicted in FIG. 3;

FIG. 5 is a plan view of the tool connecting end of the extension pole, particularly illustrating the boss and button assembly;

FIG. 6 is a bottom elevational view of the extension pole recessed surface around the bottom;

FIG. 7 is an end elevational view of the extension pole showing the locking mechanism when viewed from the handle end of the pole;

FIG. 8 is an elevational view of the end of the extension pole showing the locking mechanism when viewed from the tool connector socket end of the pole;

DETAILED DESCRIPTION

Figure 9:
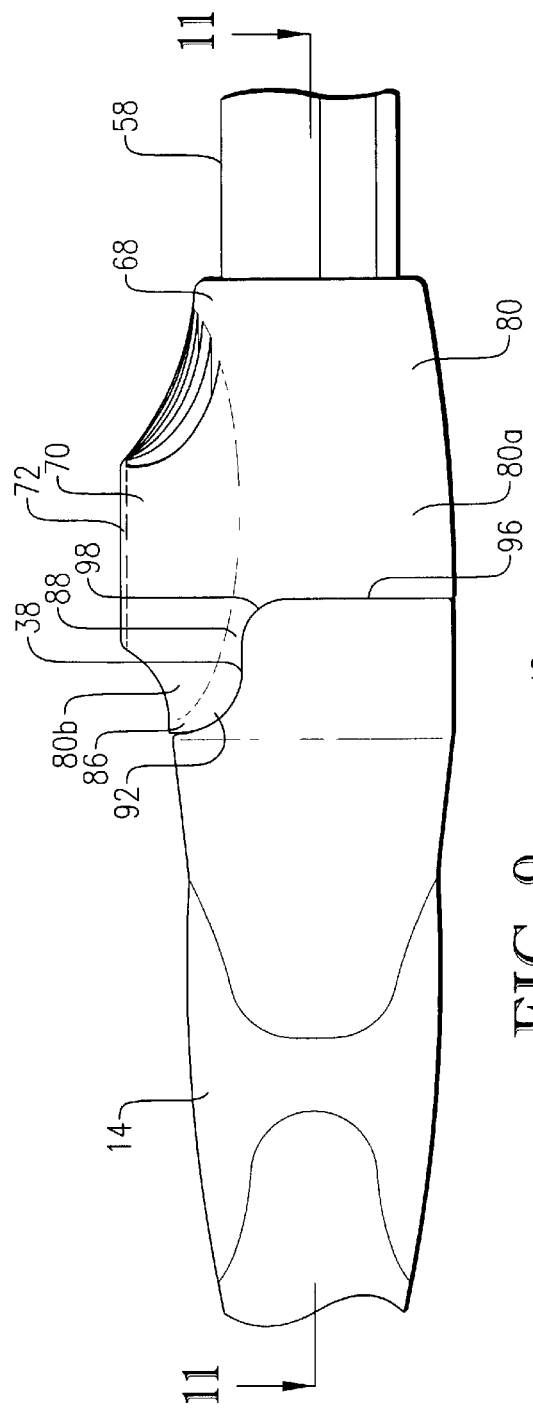
FIG. 9 is a fragmentary, enlarged side elevational view of the extension pole illustrating the key section received within the tool handle recess and the smooth unbroken outer surface cooperatively presented by the housing and tool handle.
Figure 10:
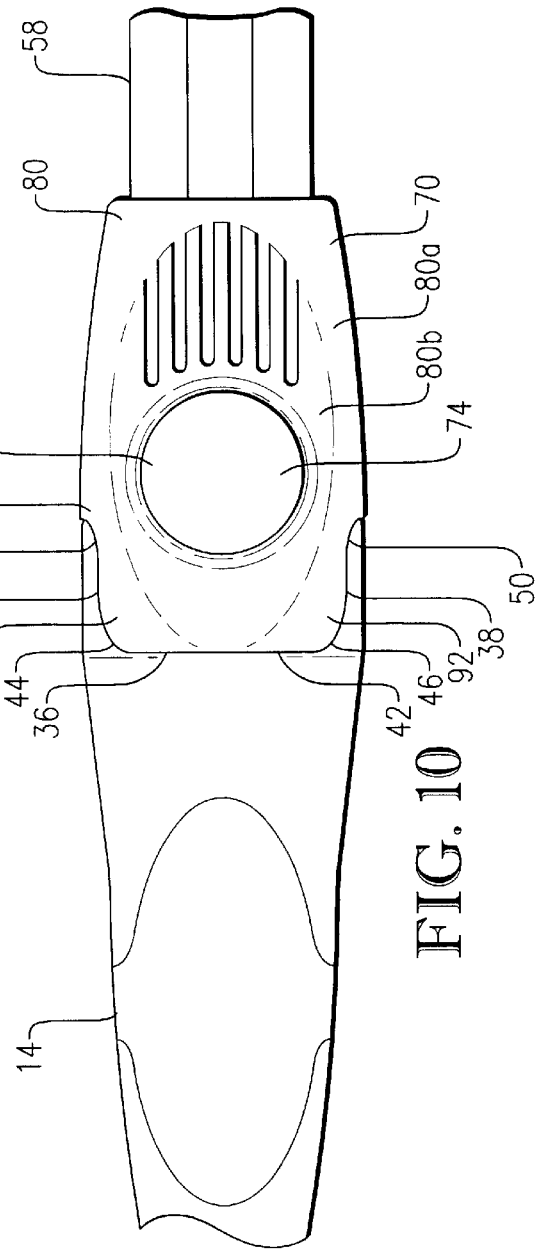
FIG. 10 is a fragmentary, enlarged plan view of the extension pole.

Turning initially to FIGS. 1 and 2, the extension pole 10 selected for illustration is shown in use with a paint roller tool 12. As will be described, the pole 10 and tool 12 are releasably interconnected so that the tool 12 may be used separably from the pole 10 and the pole 10 may be used with other tools. It shall therefore be appreciated that the principles of the present invention are not limited to a paint roller assembly, but rather it is entirely within the ambit of the present invention to utilize the inventive features with various other tools (e.g., a sanding tool, a screw driver, etc.).

With the foregoing caveat in mind, the illustrated tool 12 is similar to the paint roller assembly disclosed in the application for U.S. Letters Patent Ser. No. 09/493,296, entitled UNIVERSAL TOOL HANDLE CONFIGURED FOR VARIOUS POLE CONNECTORS, assigned of record to the assignees of the present application, and hereby incorporated by reference herein as is necessary for a full and complete understanding of the present invention. It will therefore be sufficient to describe that the paint roller assembly generally includes a handle 14, a working element in the form of a paint roller support frame 16 projecting from the handle 14, and an extension pole connector 18 (see also FIG. 11). The handle 14 presents a gripping surface 20 that has a generally circular cross section that decreases in diameter from the proximal end 22 to the distal end 24. The proximal end 22 is defined by a semicircular edge 26 that extends along a plane perpendicular to the axis of the tool handle. The edge 26 is preferably presented along an arc of approximately 260 degrees.

Figure 11:
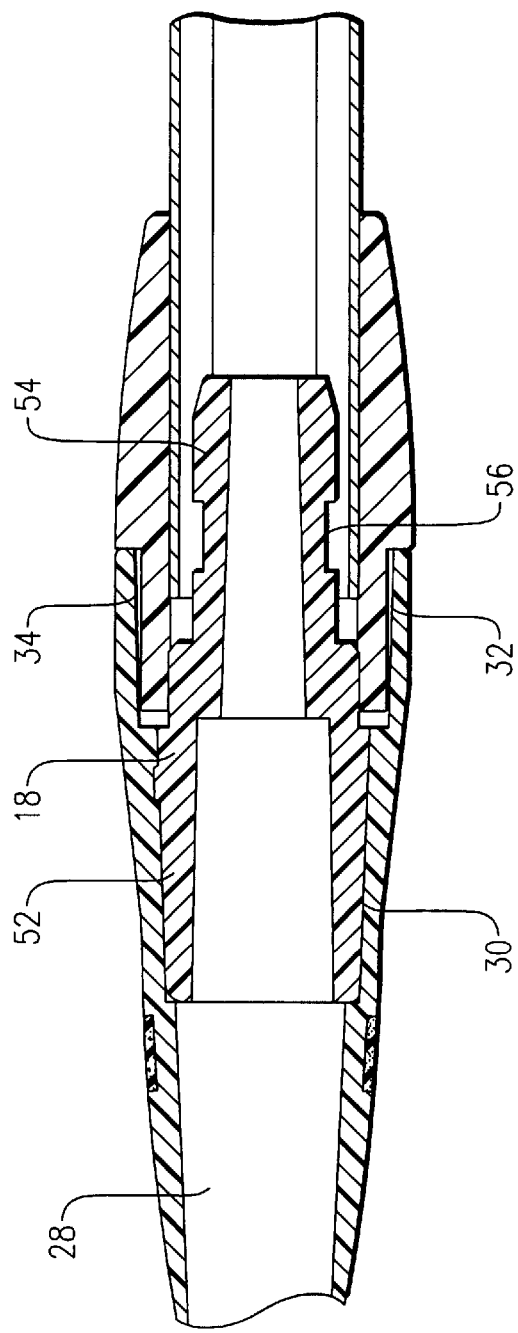
FIG. 11 is a fragmentary, cross-sectional view taken along line 11—11 of FIG. 9, particularly illustrating the snap-fit pole connector received in the tool connector socket.

The illustrated handle 14 has an opening 28 extending axially between the ends of the handle. As shown in FIG. 11, the opening 28 defines a connector socket 30 in which the pole connector 18 is received. As disclosed in the '296 application, the pole connector 18 is snap fit within the socket 30 as a result of complemental interlocking structure provided on the handle 14 and connector 18. Moreover, the proximal most section of the opening presents a pole-receiving socket 32. In the illustrated embodiment, this socket 32 is defined by a cylindrical interior wall 34. The polereceiving socket 32 extends inwardly less than one-quarter of the length of the handle 14 from the proximal end 22. The pole receiving socket 32 has a diameter corresponding to that of the extension pole 10 at the adjacent end thereof, as will subsequently be described.

Additionally, the handle 14 presents a recess 36 extending inwardly less than a quarter of the handle length from the proximal end 22 of the handle 14. It is further noted that the recess 36 does not project as far from the proximal end 22 as the interior wall 34. The illustrated recess 36 is defined by a pair of axial, opposed edges 38, 40 and a terminal edge 42, with rounded fillets 44 and 46 being defined between the terminal edge 42 and each of the opposing edges 38 and 40. A pair of rounded fillets 48 and 50 are also defined between each of the two opposing edges 38 and 40 and the proximal end 22 of the handle 14. The recess 36 is defined between the opposing edges 38,40 along an imaginary arc of approximately 100 degrees, wherein the arc is defined along a circle coaxial with the handle 14. The recess 36 is further defined as having a corresponding geometry to a portion of the pole 10 to prevent relative rotation between the pole 10 and tool 12, as will be subsequently described.

The pole connector 18 includes a tapered attachment portion 52 that is described fully in the '296 application and illustrated here in FIG. 11. It shall therefore be sufficient to explain that the attachment portion 52 is fixed within the axial opening 28 of the tool handle 14 by a snap fit type connection. As particularly illustrated in FIG. 11, the locking portion 54 of the pole connector 18 is similar to the locking portion disclosed in U.S. Pat. No. 5,682,641, entitled TOOL HANDLE WITH LOCKING ASSEMBLY, assigned of record to the assignee of the present application, and hereby incorporated by reference herein as is necessary for a full and complete understanding of the present invention. It shall therefore be sufficient to explain that the locking portion 54 of the extension pole connector 18 presents a circumferential cavity 56. The circumferential cavity 56 that cooperates with the extension pole 10 to automatically interconnect the pole 10 and tool 12 when the locking portion 54 is inserted into a corresponding opening of the extension pole.

The extension pole 10 is generally similar to that disclosed in the '641 patent incorporated herein (note, the '641 patent incorporates by reference U.S. Pat. No. 5,220,707 and the '707 shall therefore, be considered to be expressly incorporated herein). As illustrated in FIGS. 1 and 2, the extension pole 10 comprises an elongated body that presents telescopically interfitted inner and outer tubes 58 and 60 so that the length of the pole 10 (i.e., the distance between opposite ends of the pole 10) may be varied. The pole 10 is provided with a pole length retaining assembly 62 that is operable to selectively prevent extension and retraction of the pole 10. As illustrated in FIGS. 7 and 8, the interfitted inner and outer tubes 58, 60 have a corresponding polygonal cross-sectional assembly 62 is located at the distal end of the outer tube 60 and includes a circular reciprocating pin (not shown) operated by a button assembly 64 contained within a housing 66. A plurality of openings (not shown) equidistantly spaced along the length of the inner tube 58 are each configured to receive the pin therein, such that each opening corresponds with a fixed length of the pole 10. When the button assembly 64 is depressed, the pin is shifted out of the opening to permit relative movement of the tubes 58, 60.

The extension pole 10 further includes a locking mechanism 68 (i.e., an end portion) shown in the '641 patent, the locking mechanism 68 illustrated herein includes a housing 70, a reciprocating pin (not shown), and a button assembly 72 that is located within the housing 70 and is operable to control movement of the pin. It will be appreciated that the pin is received within the circumferential cavity 56 of the pole connector 18 when the pole 10 and tool 12 are interconnected. Specifically, when the pole 10 and tool 12 are sufficiently moved axially toward one another so that the connector 18 is fully inserted into the locking mechanism 68, the pin will automatically be received within the cavity 56. The button assembly 72 presents a depressible button 74 which, when depressed, lifts the locking pin into the housing 70 of the locking mechanism 68 and out of the circumferential cavity 56 presented in the pole connector 18, thereby permitting axial separation of the pole 10 and tool 12.

As perhaps best shown in FIGS. 3–6, a thin (relative to the length of the pole 10) endmost section of the narrow surface 76 preferably extends completely around the housing 70, while the remaining section of the narrow surface 76 extends only partly around the housing 70. Such remaining section of the narrow surface 76 is preferably defined along an arc ($A_1$, shown in FIG. 8) of approximately 260°. The narrow surface 76 is sized to be snugly received within the pole-receiving socket 32 of the tool handle 14, such that the surface 76 and internal wall 34 cooperatively restrict relative shifting of the pole 10 and tool 12 in directions perpendicular to the axis of the pole 10. Because the narrow surface 76 and wall 34 are cylindrical in shape in the illustrated embodiment, they do not prevent relative rotation between the pole 10 and tool 12. However, the housing 70 is provided with structure to nonetheless cooperate with the tool handle 14 in preventing relative rotation between the pole 10 and tool 12 as will be described.

The wide surface 80 presents a generally frusto-conically shaped portion 80a and a boss portion 8b that rises out of and projects generally perpendicularly from the frusto-conically shaped portion. The portion 80a is generally smooth and widens as it approaches the distal end 78 of the pole 10. The preferred boss portion 80b has a shape that may generally be described as an elliptical fillet that terminates at a circular top edge. The top edge of the boss portion 80b presents an opening 82 in which the button 74 is received. The shape of the boss portion 80b creates a smooth continuous juncture with the frusto-conical portion 80a. The boss portion 80b is generally diametrically opposed from the 260° arcuate section of the narrow surface 76.

A semicircular section 84 of the outer surface 80 projects toward the distal end 78 beyond part of the narrow surface 76. The semicircular section 84 cooperates with the 260® arcuate section of the narrow surface to extend around the housing 70, and the semicircular section 84 therefore extends along an arc ($A_2$, shown in FIG. 8) of approximately 100°. Because of the radial spacing between the narrow and wide surfaces 76 and 80, a shoulder is presented around the housing 70. Along the illustrated semicircular section 84, the shoulder comprises an endmost, circumferentially extending edge 86 and a pair of opposite, axially extending side edges 88 and 90. Rounded fillets 92 and 94 are each defined between the endmost edge 86 and respective one of the side edges 88 and 90. The shoulder further includes a semicircular edges 96 that is parallel to the endmost edge 86 and spaced inwardly therefrom. The semicircular edge 96 extends between the side edges 88 and 90, with rounded fillets 98 and 100 each similarly being defined between the edge 96 and a respective one of the side edges 88 and 90. It is noted that in the preferred semicircular section 84 is cooperatively defined by the frusto-conical portion 80a and the boss portion 80b of the wide surface 80.

Moreover, the wide surface 80 of the housing 70 and the gripping surface 20 of the handle 14 are dimensioned to provide a smooth, continuous interface between the pole 10 and tool 12. That is to say, the wide surface 80 and the gripping surface 20 are flush and cooperatively give the impression of a single unitary outer face when the pole 10 and tool 12 are interconnected. It may alternatively be said that the smooth continuous face cooperatively presented by the gripping surface 20 and wide surface 80 is generally uninterrupted and without significant gaps at the juncture between the handle 14 and housing 70. In the illustrated embodiment, the flush continuous relationship provided by the gripping surface 20 and wide surface 80 is primarily attributable to the equal thicknesses of the shoulder (defined between the narrow surface 76 and wide surface 80) and the handle wall along the recess 36 and proximal end 22 (defined between the gripping surface 20 and interior surface 34). However, the principles of the present invention are equally applicable to a shoulder and handle wall having different thicknesses. For example, different shoulder and handle wall thicknesses may be desirable if the narrow surface of the housing is modified to be substantially undersized relative to the socket and thereby loosely received therein. It will also be appreciated that the preferred abutting interengagement of the handle edges 26,38,40,42 and fillets 44,46,48,50 and the housing edges 86,88,90,96 and fillets 92,94,98,100 enhances the flush continuous relationship cooperatively provided by the gripping surface 20 and wide surface 80.

In use, the pole 10 and tool 12 are interconnected by axial movement toward one another. The pole connector 18 is inserted into the housing and cooperates with the locking mechanism 68 to automatically interlock the pole 10 and tool 12. The unique mating interfitting relationship of the handle 14 and housing 70 not only prevents relative rotation between the pole 10 and tool 12 but also provides a particularly attractive and comfortable junction therebetween. Again, this junction is uninterrupted, smooth and continuous. The extension pole 10 is therefore designed to provide a comfortable and attractive connection with the tool, while at the same time the extension pole 10 and tool 12 may not rotate relative to one another.

Figure 12:
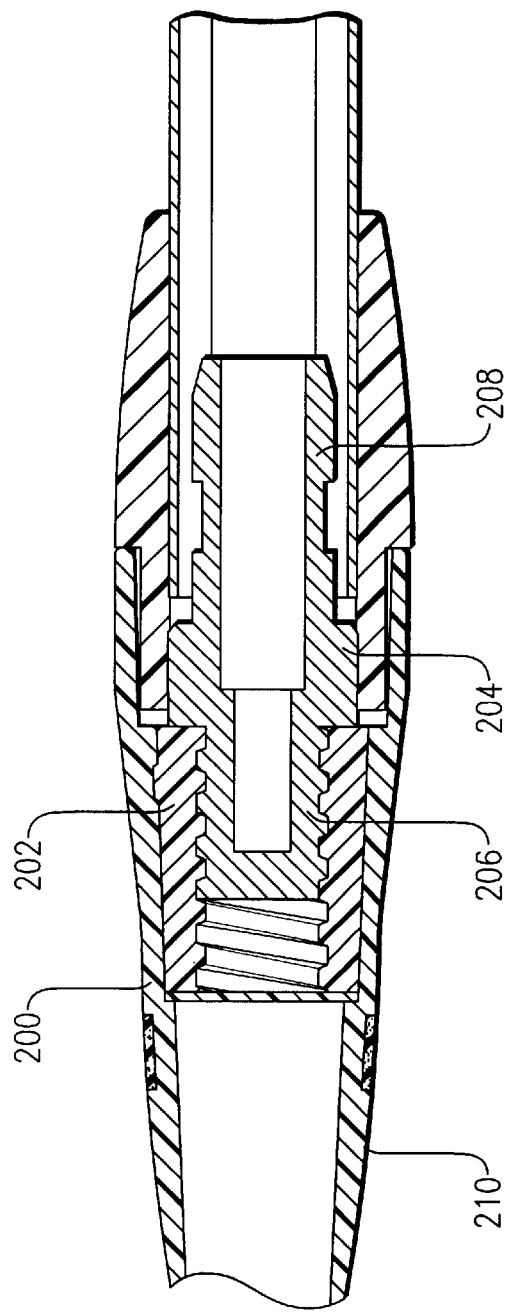
FIG. 12 is a fragmentary, cross-sectional view similar to FIG. 11, but illustrating an alternative embodiment of the present invention wherein the pole connector is of the threaded type particularly illustrating the threaded type adapter received in both the tool connector socket and internally threaded opening of the pole connector.

It is noted that the tool handle 14 illustrated in FIGS. 1–11 is provided with the pole connector 18 designed specifically for use with the locking mechanism 68. However, it is entirely within the ambit of the present invention to utilize the extension pole 10 with a tool handle having a pole connector that is not dedicated to use with the locking mechanism 68. Such an alternative configuration is shown in FIG. 12, wherein the tool handle 200 is provided with a internally threaded connector 202. It will be appreciated that such a construction is disclosed in the incorporated '296 application. Further, the illustrated connector 202 is adapted for use with "traditional" or "standard" extension poles used in the United States. A threaded adaptor 204 is provided so that the handle 200 may be used with the extension pole 10. A similar adaptor is fully disclosed in the incorporated '641 patent. It shall therefore be sufficient to explain that the adaptor 204 includes an externally threaded end 206 received in the connector 202 and an opposite end 208 that is essentially identical to the locking portion 54 of the pole connector 18 illustrated in FIG. 11. When the threaded end 206 of the adaptor 204 is fully received in the connector 202 (see FIG. 12), the positional relationships between the locking end 208 and tool handle 200 are virtually identical to those of the locking portion 54 and tool handle 14. Thus, the pole 10 similarly cooperates with the handle 200 to provide a smooth, continuous, comfortable and attractive junction between the tool 210 and pole 10.

The present invention also contemplates various other constructional modifications and alterations. For example, the configuration of the key section provided by the housing and the "keyway" provided by the handle may be varied and still perform the same function. One suitable variation involves altering the size of the key section (e.g., the key section may extend to a lesser or greater degree around the housing). It may also be possible to vary the shape of the key section (e.g., the key section may have sharp corners, be triangular in shape, etc.). Another alternative embodiment involves the use of a plurality of key sections. The key sections resemble a series of teeth that are received in a like number of correspondingly defined tool handle recesses.

The preferred forms of the invention described above are to be used as illustrations only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. An extension pole for connection to a tool having a handle, wherein the handle presents an elongated gripping surface, a pole-receiving socket extending along the length of the gripping surface, and a recess extending from an end of the gripping surface, said extension pole comprising:

an elongated body presenting first and second telescopically interfitted tubes, said elongated body presenting opposite ends, said body including an end portion adjacent one of the ends, said end portion including a locking mechanism for releasable coupling the pole to the tool, said locking mechanism including a depressible button that is operable to decouple the pole from the tool when manually depressed, said end portion presenting a narrow outer surface that projects from the one end and is defined along a circle coaxial with the body, said narrow outer surface being dimensioned and configured for receipt within the socket of the handle when the pole is connected to the tool, said end portion further presenting a wide outer surface spaced radially outward from the narrow outer surface, said wide outer surface being dimensioned and configured to be flush with the gripping surface of the handle when the pole is connected to the tool, said end portion defining an opening in the wide outer surface for allowing the button to be depressed therethrough, said wide outer surface including a key section that projects toward the one end beyond at least part of the narrow surface, said key section being received in the recess of the handle when the pole is connected to the tool.

2. An extension pole as claimed in claim 1, said narrow surface being defined along an arc of approximately 260 degrees.

3. An extension pole as claimed in claim 1, said key section being defined generally about a circle coaxial with the body, and said key section being further defined along an arc of approximately 100 degrees.

4. An extension pole for connection to a tool having a handle, wherein the handle presents an elongated gripping surface, a pole-receiving socket extending along the length of the gripping surface, and a recess extending from an end of the gripping surface, said extension pole comprising:

an elongated body presenting a distal end, said body including an end portion adjacent the distal end, said end portion presenting a narrow outer surface that projects from the distal end, said narrow outer surface being defined along a circle coaxial with the body, said narrow outer surface being dimensioned and configured for receipt within the socket of the handle when the pole is connected to the tool, said end portion further presenting a wide outer surface spaced radially outward from the narrow outer surface, said wide outer surface being dimensioned and configured to be flush with the gripping surface of the handle when the pole is connected to the tool, said wide outer surface including a key section that projects toward the distal end beyond at least part of the narrow surface, said key section being received in the recess of the handle when the pole is connected to the tool, said extension pole including a selectively releasable locking mechanism operable to releasably lock the extension pole to the tool, said locking mechanism including a housing that defines the end portion of the pole, said housing including a first frusto-conically shaped portion and a second boss portion projecting outwardly from the first portion, said key section being cooperatively defined by the first and second portions.

5. An extension pole as claimed in claim 4, said locking mechanism including a depressible button assembly located within the second boss portion, said button assembly being operable to release the locking mechanism and thereby permit disconnection of the extension pole from the tool, when pressed.

6. An extension pole for connection to a tool having a handle, wherein the handle presents an elongated gripping surface, a pole-receiving socket extending along the length of the gripping surface, and a recess extending from an end of the gripping surface, said extension pole comprising:

an elongated body presenting a distal end, said body including an end portion adjacent the distal end, said end portion presenting a narrow outer surface that projects from the distal end, said narrow outer surface being defined along a circle coaxial with the body, said narrow outer surface being dimensioned and configured for receipt within the socket of the handle when the pole is connected to the tool, said end portion further presenting a wide outer surface spaced radially outward from the narrow outer surface, said wide outer surface being dimensioned and configured to be flush with the gripping surface of the handle when the pole is connected to the tool, said wide outer surface including a key section that projects toward the distal end beyond at least part of the narrow surface, said key section being received in the recess of the handle when the pole is connected to the tool, said elongated body being extendable, said body comprising telescopically interfitted inner and outer tubes, said tubes having similar polygonal shapes operable to restrict relative rotational movement therebetween.

7. An extension pole for connection to a tool having a handle, wherein the handle presents an elongated gripping surface, a pole-receiving socket extending along the length of the gripping surface, and a recess extending from an end of the gripping surface, said extension pole comprising:

an elongated body presenting a distal end, said body including an end portion adjacent the distal end, said end portion presenting an narrow outer surface that projects from the distal end, said narrow outer surface being defined along a circle coaxial with the body, said narrow outer surface being dimensioned and configured for receipt within the socket of the handle when the pole is connected to the tool, said end portion further presenting a wide outer surface spaced radially outward from the narrow outer surface, said wide outer surface being dimensioned and configured to be flush with the gripping surface of the handle when the pole is connected to the tool, said wide outer surface including a key section that projects toward the distal end beyond at least part of the narrow surface, said key section being received in the recess of the handle when the pole is connected to the tool, said end portion having a pole connector socket having a polygonal cross-sectional shape coaxial with the body.

* * * * *